United States Patent
Hamada et al.

(10) Patent No.: US 11,752,809 B2
(45) Date of Patent: Sep. 12, 2023

(54) PNEUMATIC TIRE

(71) Applicant: Sumitomo Rubber Industries, Ltd., Hyogo (JP)

(72) Inventors: Toshiaki Hamada, Kobe (JP); Masahiro Tatsuta, Kobe (JP); Hiroki Uno, Kobe (JP); Hiroto Takenaka, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 1044 days.

(21) Appl. No.: 16/450,766

(22) Filed: Jun. 24, 2019

(65) Prior Publication Data

US 2020/0001665 A1    Jan. 2, 2020

(30) Foreign Application Priority Data

Jun. 28, 2018 (JP) ................................. 2018-123182

(51) Int. Cl.
*B60C 15/06* (2006.01)
*B60C 15/00* (2006.01)

(52) U.S. Cl.
CPC ...... *B60C 15/0603* (2013.01); *B60C 15/0009* (2013.01); *B60C 15/0607* (2013.01); *B60C 2015/061* (2013.01); *B60C 2015/0614* (2013.01); *B60C 2015/0617* (2013.01); *Y10T 152/10828* (2015.01); *Y10T 152/10837* (2015.01); *Y10T 152/10846* (2015.01)

(58) Field of Classification Search
CPC ............ B60C 15/0603; B60C 15/0607; B60C 2015/061; B60C 2015/0614; B60C 2015/0617; B60C 2015/0621
See application file for complete search history.

(56) References Cited

U.S. PATENT DOCUMENTS

| | | | | |
|---|---|---|---|---|
| 6,478,064 | B1 * | 11/2002 | Ueyoko .................... | 152/546 |
| 2015/0217605 | A1 * | 8/2015 | Munezawa ......... | B60C 15/0607 |
| | | | | 152/541 |
| 2017/0072750 | A1 * | 3/2017 | Munezawa ......... | B60C 15/0603 |
| 2020/0023691 | A1 * | 1/2020 | Sueno ................. | B60C 15/0607 |

FOREIGN PATENT DOCUMENTS

| | | |
|---|---|---|
| EP | 2 905 151 A1 | 8/2015 |
| EP | 3 112 189 A1 | 1/2017 |
| JP | 2000-094914 A | 4/2000 |
| JP | 2016-052840 A | 4/2016 |

OTHER PUBLICATIONS

The extended European search report issued by the European Patent Office dated Oct. 23, 2019, which corresponds to European Application No. 19178190.5-1012 and is related to U.S. Appl. No. 16/450,766.

* cited by examiner

*Primary Examiner* — Adrienne C. Johnstone
(74) *Attorney, Agent, or Firm* — Studebaker & Brackett PC

(57) ABSTRACT

In a tire 22, a length from a center PM in an axial direction of a boundary 60 between a core 48 and an apex 50 to an outer edge PA of the apex 50 is not less than 10 mm and not greater than 15 mm. In a state where the tire 22 is mounted on a normal rim and an internal pressure of the tire 22 is adjusted to 10% of a normal internal pressure, a main body portion 54 of a carcass ply 52 extending along an inner surface 62 of the apex 50 is tilted relative to the axial direction, and an angle of the main body portion 54 relative to the axial direction is not less than 40° and not greater than 60°.

7 Claims, 6 Drawing Sheets

PNEUMATIC TIRE

The present application is based upon and claims the benefit of priority to Japanese Patent Application No. 2018-123182, filed Jun. 28, 2018, the entire contents of which are incorporated herein by reference.

BACKGROUND OF THE INVENTION

Field of the Invention

The present invention relates to pneumatic tires.

Description of the Related Art

As shown in FIG. 6, each bead 4 of a tire 2 includes a core 6 and an apex 8. A hard crosslinked rubber is used for the apex 8. To ensure desired stiffness, an apex 8 having a length of about 30 mm to 40 mm is used.

A carcass 10 of the tire 2 includes a carcass ply 12 that is turned up around each core 6. The carcass ply 12 has a main body portion 14 that extends on and between one core 6 and the other core 6. At each bead 4 portion, the main body portion 14 extends radially outward from the core 6 along an inner surface 16 of the apex 8 while spreading axially outward.

As shown in FIG. 6, the degree of tilt relative to the axial direction of the main body portion 14 extending along the inner surface 16 of the apex 8 is high at the core 6 side and low at the outer edge 18 side of the apex 8. That is, in the tilt of the main body portion 14, there is an inflection point at which the tilt angle greatly changes from a large portion to a small portion.

Each bead 4 portion is fitted onto a rim R. A large load is applied to the bead 4 portion. To improve performance such as durability, various studies have been made for the structure of the bead 4 portion (for example, Japanese Laid-Open Patent Publication No. 2016-052840).

From consideration for the environment, development of tires having low rolling resistance is in progress. The tread of a tire comes into contact with a road surface. To reduce rolling resistance, a rubber composition in which heat generation due to deformation is inhibited has been developed, and has been used for a tread. Further reduction of rolling resistance is required, and it is difficult to meet the requirement level only through studying the structure of a tread.

If the small apex disclosed in Japanese Laid-Open Patent Publication No. 2016-052840 is used for a bead, there is a possibility that weight reduction can be achieved and reduction of rolling resistance can be achieved. However, in this case, the stiffness may become insufficient and thus the steering stability may decrease. Establishment of technology to achieve reduction of rolling resistance while ensuring desired stiffness is required.

The present invention has been made in view of the above circumstances, and an object of the present invention is to provide a pneumatic tire that achieves reduction of rolling resistance while ensuring desired stiffness.

SUMMARY OF THE INVENTION

As a result of a thorough study to achieve reduction of rolling resistance while ensuring desired stiffness, the present inventors have found that tilt of a main body portion extending along an apex influences the rolling resistance and the in-plane torsional stiffness of a tire, and have completed the present invention.

A pneumatic tire according to an aspect of the present invention is a pneumatic tire including: a tread; a pair of sidewalls connected to edges of the tread; a pair of beads each having a core extending in a circumferential direction and an apex located radially outward of the core; a carcass extending from one bead to the other bead at an inner side of the tread and the pair of sidewalls; and a pair of clinches located radially inward of the sidewalls, wherein the carcass includes a carcass ply having a main body portion that extends on and between one core and the other core and a pair of turned-up portions that are connected to the main body portion and turned up around the cores from an inner side toward an outer side in an axial direction, a length from a center in the axial direction of a boundary between the core and the apex to an outer edge of the apex is not less than 10 mm and not greater than 15 mm, and in a state where the tire is mounted on a normal rim and an internal pressure of the tire is adjusted to 10% of a normal internal pressure, the main body portion extending along an inner surface of the apex is tilted relative to the axial direction, and an angle of the main body portion relative to the axial direction is not less than 40° and not greater than 60°.

Preferably, in the pneumatic tire, the main body portion extends linearly at a portion axially inward with respect to a straight line that extends in a radial direction and passes through a radially outer edge of a contact surface of the tire and a rim on which the tire is mounted.

Preferably, in the pneumatic tire, a loss tangent of each clinch is lower than a loss tangent of the apex, and a complex elastic modulus of each clinch is lower than a complex elastic modulus of the apex.

Preferably, in the pneumatic tire, a thickness of each clinch measured along a line that is normal to the carcass and passes through a position on an outer surface of the tire at which a distance in a radial direction from a bead base line is 25 mm is not less than 4 mm.

Preferably, in the pneumatic tire, a reinforcing layer is provided between the carcass and each clinch, the reinforcing layer is a rubber reinforcing layer formed from a crosslinked rubber, a loss tangent of the rubber reinforcing layer is equal to a loss tangent of the apex or lower than the loss tangent of the apex, a complex elastic modulus of the rubber reinforcing layer is not greater than 100 MPa, and the complex elastic modulus of the rubber reinforcing layer is equal to a complex elastic modulus of the apex or higher than the complex elastic modulus of the apex.

More preferably, in the pneumatic tire, the loss tangent of the rubber reinforcing layer is higher than a loss tangent of the clinch, and the complex elastic modulus of the rubber reinforcing layer is higher than a complex elastic modulus of the clinch.

More preferably, in the pneumatic tire, an outer edge of the rubber reinforcing layer is located radially outward of an outer edge of the clinch and radially inward of a maximum width position.

Preferably, in the pneumatic tire, a reinforcing layer is provided between the carcass and each clinch, the reinforcing layer is a rubber reinforcing layer formed from a crosslinked rubber, a loss tangent of the rubber reinforcing layer is equal to a loss tangent of the apex or lower than the loss tangent of the apex, a complex elastic modulus of the rubber reinforcing layer is greater than 100 MPa, and the complex elastic modulus of the rubber reinforcing layer is equal to a complex elastic modulus of the apex or lower than the complex elastic modulus of the apex.

Preferably, in the pneumatic tire, a reinforcing layer is provided between the carcass and each clinch, the reinforcing layer is a cord reinforcing layer including a large number of filler cords aligned with each other, and an inner edge of the cord reinforcing layer overlaps the apex in the axial direction.

More preferably, in the pneumatic tire, a proportion of a height in a radial direction of the cord reinforcing layer to a cross-sectional height of the tire is not less than 20% and not greater than 50%.

According to the present invention, a pneumatic tire that achieves reduction of rolling resistance while ensuring desired stiffness is obtained.

DETAILED DESCRIPTION OF THE EMBODIMENTS

The following will describe in detail the present invention based on preferred embodiments with appropriate reference to the drawings.

In the present invention, a state where a tire is mounted on a rim (normal rim), the internal pressure of the tire is adjusted to a normal internal pressure, and no load is applied to the tire is referred to as normal state. In the present invention, unless otherwise specified, the dimensions and angles of the tire and each tire component are measured in the normal state.

In the present specification, the normal rim means a rim specified in a standard on which the tire is based. The "standard rim" in the JATMA standard, the "Design Rim" in the TRA standard, and the "Measuring Rim" in the ETRTO standard are normal rims.

In the present specification, the normal internal pressure means an internal pressure specified in the standard on which the tire is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures.

In the present specification, a normal load means a load specified in the standard on which the tire is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard are normal loads.

First Embodiment

Figure 1:
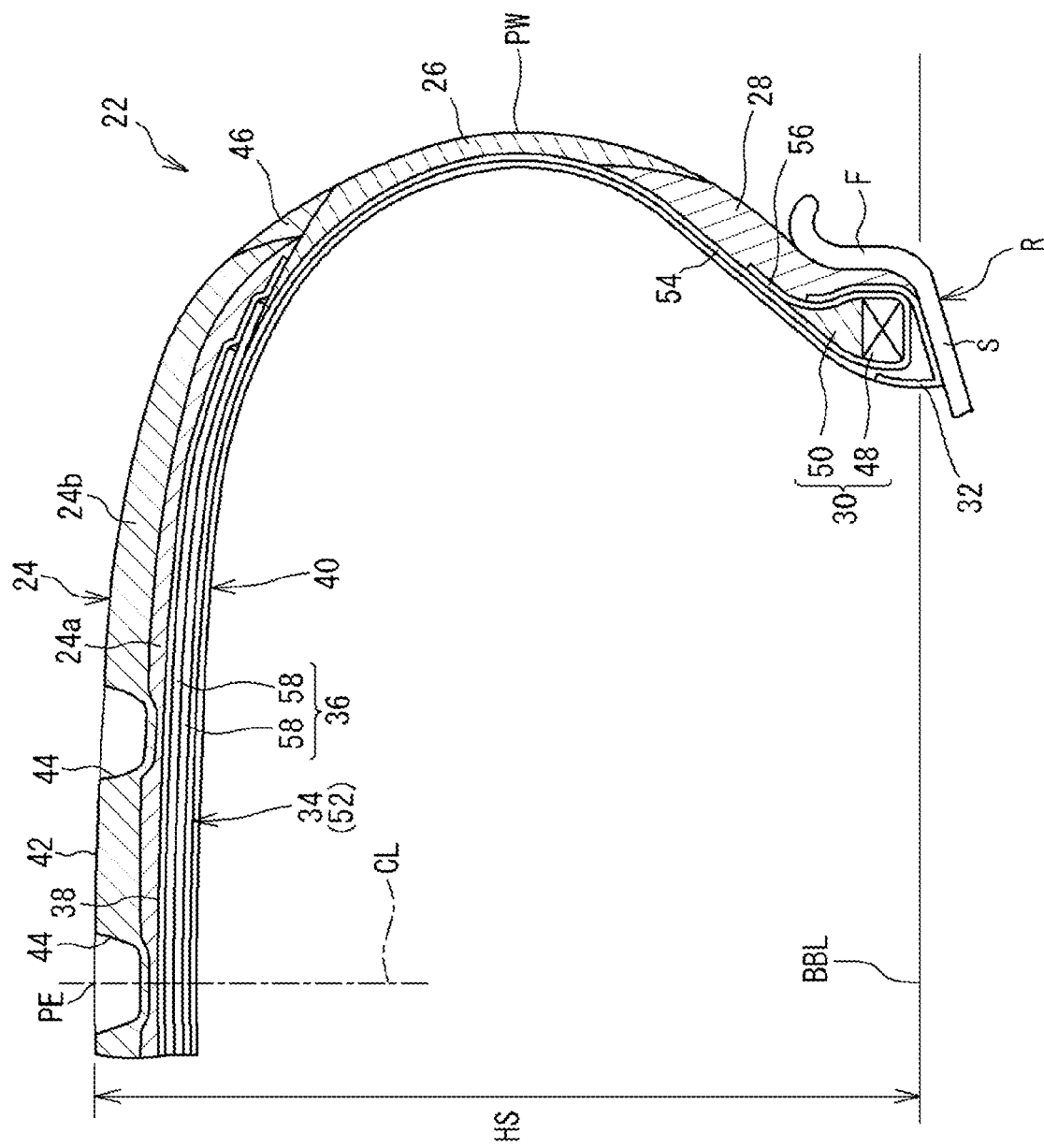
FIG. 1 is a cross-sectional view of a part of a pneumatic tire according to an embodiment of the present invention.

FIG. 1 shows a part of a pneumatic tire 22 (hereinafter, simply referred to as "tire 22") according to an embodiment of the present invention. The tire 22 is mounted to a passenger car.

FIG. 1 shows a part of a cross-section of the tire 22 along a plane including the rotation axis of the tire 22. In FIG. 1, the right-left direction is the axial direction of the tire 22, and the up-down direction is the radial direction of the tire 22. The direction perpendicular to the surface of the sheet of FIG. 1 is the circumferential direction of the tire 22. In FIG. 1, an alternate long and short dash line CL represents the equator plane of the tire 22.

In FIG. 1, the tire 22 is mounted on a rim R. The rim R is a normal rim. The interior of the tire 22 is filled with air, and the internal pressure of the tire 22 is adjusted to a normal internal pressure. No load is applied to the tire 22.

In FIG. 1, a solid line BBL extending in the axial direction is a bead base line. The bead base line BBL is a line that defines the rim diameter (see JATMA or the like) of the rim R (normal rim).

The tire 22 includes a tread 24, a pair of sidewalls 26, a pair of clinches 28, a pair of beads 30, a pair of chafers 32, a carcass 34, a belt 36, a band 38, and an inner liner 40.

The outer surface of the tread 24 comes into contact with a road surface. The outer surface of the tread 24 is a tread surface 42. Grooves 44 are formed on the tread 24. In the tire 22, the tread 24 includes a base portion 24a and a cap portion 24b located radially outward of the base portion 24a. The base portion 24a is formed from a crosslinked rubber for which adhesion is taken into consideration. The cap portion 24b is formed from a crosslinked rubber for which abrasion resistance and grip performance are taken into consideration.

In FIG. 1, reference character PE represents the equator of the tire 22. The equator PE is the point of intersection of the equator plane CL and a virtual tread surface obtained on the assumption that the grooves 44 are not present. A double-headed arrow HS represents the distance in the radial direction from the bead base line BBL to the equator PE. The distance HS in the radial direction is the cross-sectional height (see JATMA or the like) of the tire 22.

Each sidewall 26 is connected to an edge of the tread 24. The sidewall 26 extends radially inward from the edge of the tread 24 along the carcass 34. The sidewall 26 is formed from a crosslinked rubber. The sidewall 26 protects the carcass 34. In the tire 22, a wing 46 is disposed between the sidewall 26 and the tread 24.

Each clinch 28 is located radially inward of the sidewall 26. As shown in FIG. 1, a part of the clinch 28 comes into contact with a flange F of the rim R. The clinch 28 is formed from a crosslinked rubber for which abrasion resistance is taken into consideration.

In FIG. 1, reference character PW represents an axially outer end of the tire 22. The outer end PW is specified on the basis of a virtual side surface obtained on the assumption that decorations such as patterns and letters are not present on the outer surfaces of the sidewall 26 and the clinch 28, that is, a side surface of the tire 22. The distance in the axial direction from one outer end PW to the other outer end PW is the maximum width of the tire 22, that is, the cross-sectional width (see JATMA or the like) of the tire 22. The outer end PW is a position at which the tire 22 has the maximum width.

Each bead 30 is located axially inward of the clinch 28. The bead 30 includes a core 48 and an apex 50. The core 48 extends in the circumferential direction. As shown in FIG. 1, the core 48 has a rectangular cross-sectional shape. The core 48 includes a wire made of steel. The apex 50 is located radially outward of the core 48. In the cross-section of the tire 22 shown in FIG. 1, the apex 50 is tapered outward in the radial direction.

In the tire 22, the apex 50 is formed from a crosslinked rubber having high stiffness. Specifically, a complex elastic modulus E*a of the apex 50 is not less than 60 MPa and not greater than 120 MPa. A loss tangent LTa of the apex 50 is not less than 0.16 and not greater than 0.18.

In the present invention, the complex elastic moduli and loss tangents (also referred to as tan δ) of the components of the tire 22 such as the apex 50 are measured according to the standards of JIS K6394 using a viscoelasticity spectrometer under the following conditions.

Initial strain: 10%
Amplitude: ±1%
Frequency: 10 Hz
Deformation mode: tension
Measurement temperature: 70° C.

Each chafer 32 is located radially inward of the bead 30. As shown in FIG. 1, at least a part of the chafer 32 comes into contact with a seat S of the rim R. In the tire 22, the chafer 32 includes a fabric and a rubber with which the fabric is impregnated.

The carcass 34 is located inward of the tread 24, the pair of sidewalls 26, and the pair of clinches 28. The carcass 34 extends from one bead 30 toward the other bead 30. The carcass 34 includes at least one carcass ply 52. In the tire 22, the carcass 34 is composed of the one carcass ply 52.

The carcass ply 52 includes a large number of cords aligned with each other. The carcass cords are covered with a topping rubber. Each carcass cord intersects the equator plane CL. In the tire 22, the angle of each carcass cord relative to the equator plane CL is not less than 70° and not greater than 90°. The carcass 34 of the tire 22 has a radial structure. In the tire 22, a cord formed from an organic fiber is used as each carcass cord.

In the tire 22, the carcass ply 52 is turned up around each core 48. The carcass ply 52 has: a main body portion 54 that extends on and between one core 48 and the other core 48; and a pair of turned-up portions 56 that are connected to the main body portion 54 and turned up around the respective cores 48 from the inner side toward the outer side in the axial direction.

The belt 36 is layered over the carcass 34 at the radially inner side of the tread 24. In the tire 22, the belt 36 includes two belt plies 58.

Each belt ply 58 includes a large number of belt cords aligned with each other, which are not shown. Each belt cord is tilted relative to the equator plane CL. The angle of each belt cord relative to the equator plane CL is not less than 10° and not greater than 35°. In the tire 22, the material of the belt cords is steel.

The band 38 is located between the tread 24 and the belt 36 in the radial direction. The band 38 covers the entirety of the belt 36. The band 38 has a jointless structure. The band 38 includes a helically wound band cord, which is not shown. A cord formed from an organic fiber is used as the band cord.

The inner liner 40 is located inward of the carcass 34. The inner liner 40 forms the inner surface of the tire 22. The inner liner 40 is formed from a crosslinked rubber that has an excellent air blocking property. The inner liner 40 maintains the internal pressure of the tire 22.

Figure 2:
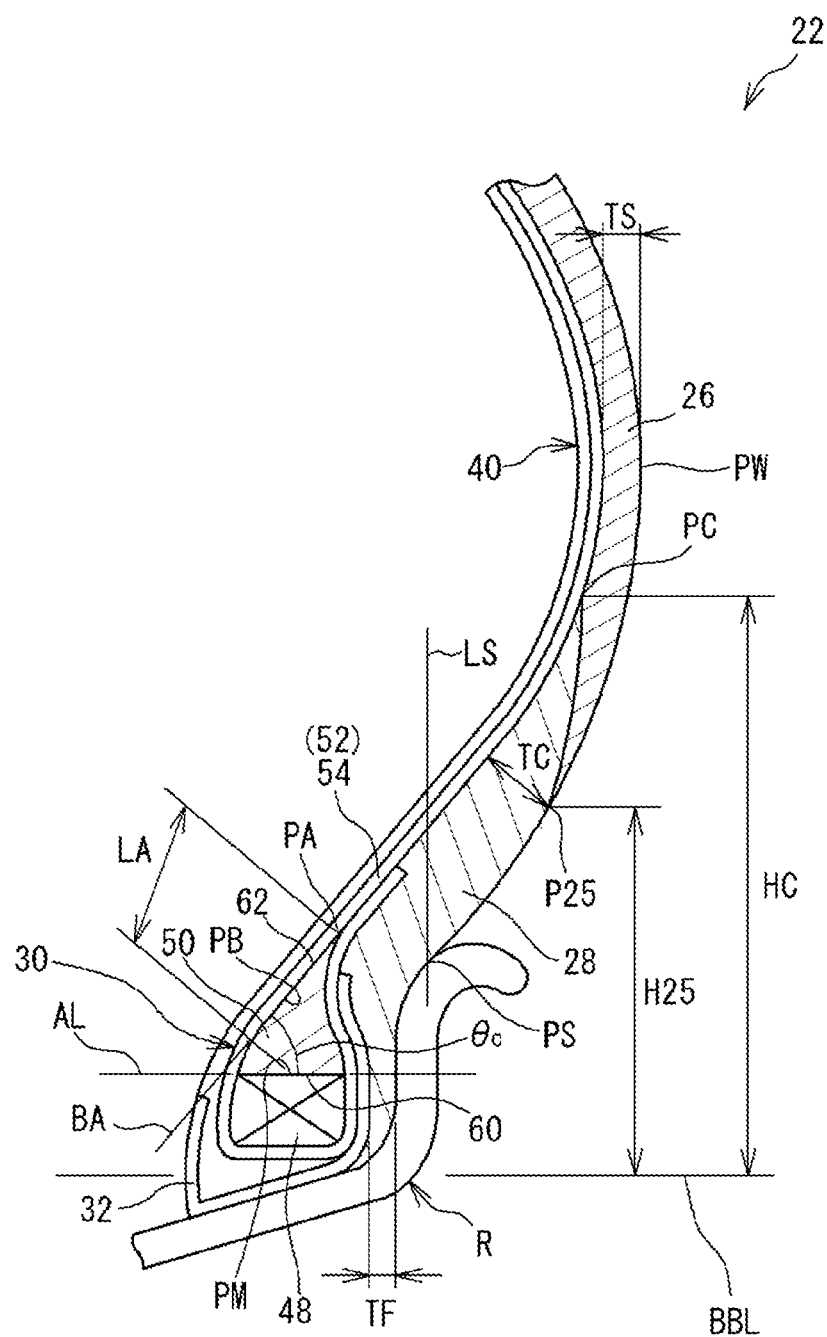
FIG. 2 is a cross-sectional view of a part of the tire in FIG. 1.

FIG. 2 shows a part of the cross-section of the tire 22 shown in FIG. 1. In FIG. 2, a bead 30 portion of the tire 22 is shown. In FIG. 2, the right-left direction is the axial direction of the tire 22, and the up-down direction is the radial direction of the tire 22. The direction perpendicular to the surface of the sheet of FIG. 2 is the circumferential direction of the tire 22.

In FIG. 2, reference character PM represents the center in the axial direction of a boundary 60 between the core 48 and the apex 50. Reference character PA represents an outer edge of the apex 50. A double-headed arrow LA represents the length from the center PM in the axial direction of the boundary 60 to the outer edge PA of the apex 50. The length LA is the length of the apex 50.

In the tire 22, the length LA from the center PM in the axial direction of the boundary 60 to the outer edge PA of the apex 50, that is, the length LA of the apex 50, is not less than 10 mm and not greater than 15 mm. In the conventional tire 2, the length of the apex 8 is normally set within a range of 30 to 40 mm. The apex 50 of the tire 22 is small. The apex 50 contributes to weight reduction. The apex 50 contributes to reduction of rolling resistance.

In FIG. 2, reference character PB represents the position on an inner surface 62 of the apex 50 corresponding to the position at which the height in the radial direction of the apex 50 is half. A solid line BA is a straight line that passes through the position PB and the outer edge PA of the apex 50. The solid line BA is tilted relative to the axial direction.

At the bead 30 portion, the main body portion 54 of the carcass ply 52 extends from the core 48 toward the outer edge PA of the apex 50 along the inner surface 62 of the apex 50. As shown in FIG. 2, in the tire 22, the main body portion 54 is tilted relative to the axial direction. In the present invention, the direction in which the main body portion 54, which extends along the inner surface 62 of the apex 50, is tilted is specified by the direction in which the aforementioned solid line BA is tilted.

In FIG. 2, a solid line AL is a straight line that passes through the center PM in the axial direction of the boundary 60 between the core 48 and the apex 50 and extends in the axial direction. An angle represented by reference character θc is the angle of the solid line BA relative to the solid line AL. In the present invention, at the bead 30 portion, the angle of the main body portion 54, which extends along the inner surface 62 of the apex 50, relative to the axial direction is represented by the angle θc.

In the present invention, the aforementioned angle θc is measured in a state where the tire 22 is mounted on the rim R (normal rim), the internal pressure of the tire 22 is adjusted to 10% of the normal internal pressure, and no load is applied to the tire 22. Although not shown, in production of the tire 22, the tire 22 is formed by pressing a raw cover (uncrosslinked tire 22) against the cavity face of a mold. The outer surface of the tire 22 in the aforementioned state corresponds to the outer surface of the tire 22 represented by the cavity face of the mold.

As described above, in the tire 22, the main body portion 54, which extends along the inner surface 62 of the apex 50, is titled relative to the axial direction. In particular, in the tire 22, the angle θc of the main body portion 54 relative to the axial direction at the bead 30 portion is not less than 40° and not greater than 60°.

In FIG. 2, reference character PS represents the radially outer edge of a contact surface of the tire 22 and the rim R. A solid line LS is a straight line that passes through the outer edge PS and extends in the radial direction.

In the tire 22, in the main body portion 54 of the carcass ply 52, a portion extending along the solid line BA, which specifies the tilt angle θc of the main body portion 54, is present between the core 48 and the position PW at which the maximum width is obtained. As shown in FIG. 2, in the tire 22, the main body portion 54 extends linearly along the solid line BA at least at a portion axially inward with respect to the solid line LS.

In the tire 22, the apex 50, which is smaller than that in the conventional tire 2, is used, and the tilt angle θc of the main body portion 54, which extends along the inner surface 62 of the apex 50, is set within a range of 40° to 60°. In the tire 22, between the core 48 and the position PW at which the maximum width is obtained, the main body portion 54 does not extend so as to draw a curved line as in the conventional tire 2, but extends substantially linearly. Since the main body portion 54 is formed with a short length at the bead 30 portion, volume reduction is achieved in the tire 22. In the tire 22, reduction of rolling resistance is achieved.

As described above, in the tire 22, between the core 48 and the position PW at which the maximum width is obtained, the main body portion 54 extends substantially linearly. In the shape of the main body portion 54, an inflection point that is observed in the conventional tire 2 is not formed. In the tire 22, reduction of in-plane torsional stiffness based on the shape of the main body portion 54 is inhibited. In the tire 22, although the small apex 50 is used, sufficient stiffness is ensured. The tire 22 has excellent steering stability. In the tire 22, reduction of rolling resistance is achieved while desired stiffness is ensured.

In the tire 22, a loss tangent LTc of the clinch 28 is preferably lower than the loss tangent LTa of the apex 50. In the clinch 28, heat generation due to deformation is inhibited as compared to that in the apex 50. The clinch 28 effectively contributes to reduction of rolling resistance. From this standpoint, the difference (LTa−LTc) between the loss tangent LTa of the apex 50 and the loss tangent LTc of the clinch 28 is preferably not less than 0.05. From the standpoint that good durability is maintained, the difference (LTa−LTc) is preferably not greater than 0.15.

In the tire 22, the loss tangent LTc of the clinch 28 is preferably not less than 0.04 and preferably not greater than 0.11. When the loss tangent LTc is set so as to be not less than 0.04, the clinch 28 has appropriate strength. In the tire 22, good durability is maintained. When the loss tangent LTc is set so as to be not greater than 0.11, the clinch 28 contributes to reduction of rolling resistance.

In the tire 22, a complex elastic modulus $E^*c$ of the clinch 28 is preferably lower than the complex elastic modulus $E^*a$ of the apex 50. The clinch 28 is more flexible than the apex 50. The clinch 28 contributes to the structure of the main body portion 54, which extends linearly between the core 48 and the position PW at which the maximum width is obtained. In the tire 22, since reduction of in-plane torsional stiffness based on the shape of the main body portion 54 is inhibited, sufficient stiffness is ensured. From this standpoint, the ratio ($E^*c/E^*a$) of the complex elastic modulus $E^*c$ of the clinch 28 to the complex elastic modulus $E^*a$ of the apex 50 is preferably not greater than 0.25. From the standpoint that good durability is maintained, the ratio ($E^*c/E^*a$) is preferably not less than 0.04.

In the tire 22, the complex elastic modulus $E^*c$ of the clinch 28 is preferably not less than 5 MPa and preferably not greater than 15 MPa. When the complex elastic modulus $E^*c$ is set so as to be not less than 5 MPa, the clinch 28 contributes to ensuring desired in-plane torsional stiffness. In the tire 22, good steering stability is maintained. When the complex elastic modulus $E^*c$ is set so as to be not greater than 15 MPa, the clinch 28 has appropriate flexibility. In the tire 22, good durability is maintained.

In the tire 22, from the standpoint that reduction of rolling resistance is achieved while desired stiffness is ensured, more preferably, the loss tangent LTc of the clinch 28 is lower than the loss tangent LTa of the apex 50, and the complex elastic modulus $E^*c$ of the clinch 28 is lower than the complex elastic modulus $E^*a$ of the apex 50.

In the present invention, the loss tangent LTc and the complex elastic modulus $E^*c$ of the clinch 28 are measured in the same manner as the loss tangent LTa and the complex elastic modulus $E^*a$ of the apex 50.

In FIG. 2, reference character P25 represents the position on the outer surface of the tire 22 at which a distance, in the radial direction from the bead base line BBL, that is represented by a double-headed arrow H25 is 25 mm A double-headed arrow TC represents the thickness of the clinch 28 at the position P25. The thickness TC is measured along a line that passes through the position P25 and is normal to the main body portion 54 of the carcass 34. Reference character PC represents an outer edge of the clinch 28. A double-headed arrow HC represents the distance in the radial direction from the bead base line BBL to the outer edge PC of the clinch 28.

In the tire 22, the thickness TC of the clinch 28, which is measured along the line that is normal to the main body portion 54 of the carcass 34 and passes through the position P25 on the outer surface of the tire 22 at which the distance in the radial direction from the bead base line BBL is 25 mm, is preferably not less than 4 mm Thus, the clinch 28 has an appropriate thickness. In the tire 22, good durability is obtained. A large volume influences rolling resistance. From the standpoint of low rolling resistance, the thickness TC of the clinch 28 is preferably not greater than 5 mm.

In the tire 22, the distance HC in the radial direction from the bead base line BBL to the outer edge PC of the clinch 28 is preferably not less than 30 mm and preferably not greater than 40 mm. When the distance HC is set so as to be not less than 30 mm, the clinch 28 contributes to ensuring desired stiffness of the tire 22. In the tire 22, good durability is obtained. When the distance HC is set so as to be not greater than 40 mm, the volume of the clinch 28 is appropriately maintained. In the tire 22, influence of the clinch 28 on rolling resistance is inhibited.

In FIG. 2, a double-headed arrow TS represents the thickness of the sidewall 26. The thickness TS is measured at the position PW at which the tire 22 has the maximum width. A double-headed arrow TF represents the thickness of the clinch 28 located between the bead 30 and the flange F of the rim R. The thickness TF is measured along the straight line that passes through the center PM in the axial direction of the boundary 60 between the core 48 and the apex 50 and extends in the axial direction, that is, the solid line AL.

In the tire 22, the thickness TS of the sidewall 26 at the position PW at which the maximum width is obtained is preferably not less than 1.5 mm and preferably not greater than 3.0 mm. When the thickness TS is set so as to be not less than 1.5 mm, the sidewall 26 having a sufficient volume is formed outward of the carcass 34. In the tire 22, the sidewall 26 effectively protects the carcass 34. When the thickness TS is set so as to be not greater than 3.0 mm, the volume of the sidewall 26 is appropriately maintained. In the tire 22, influence of the sidewall 26 on weight and rolling resistance is inhibited.

In the tire 22, the thickness TF of the clinch 28 located between the bead 30 and the flange F of the rim R is preferably not less than 1 mm and preferably not greater than 4 mm. When the thickness TF is set so as to be not less than 1 mm, the clinch 28 contributes to prevention of exposure of the carcass 34. When the thickness TF is set so as to be not greater than 4 mm, the core 48 is placed at an appropriate position with respect to a rim when the tire 22 is mounted to the rim.

Second Embodiment

Figure 3:
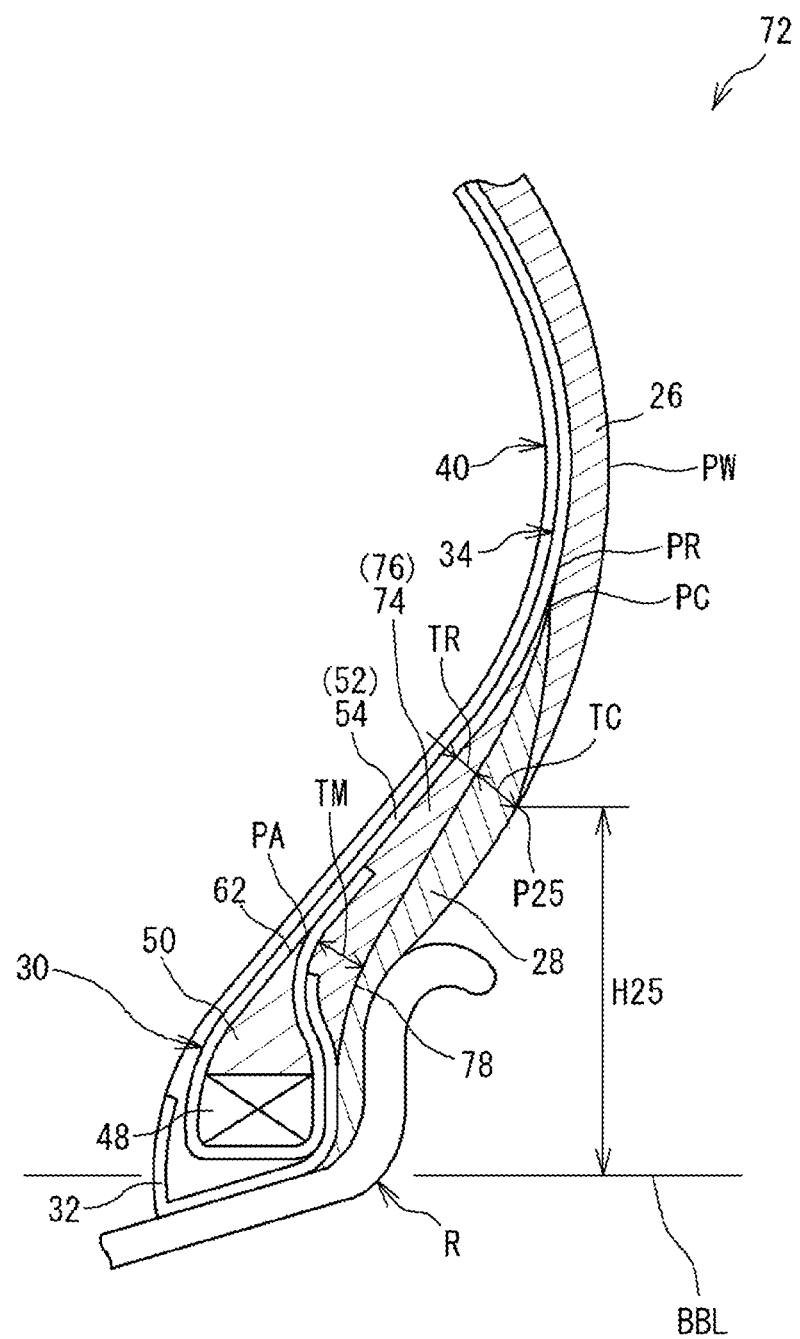
FIG. 3 is a cross-sectional view of a part of a pneumatic tire according to another embodiment of the present invention.

FIG. 3 shows a part of a pneumatic tire 72 according to another embodiment of the present invention. FIG. 3 shows a part of a cross-section of the tire 72 along a plane including the rotation axis of the tire 72. In FIG. 3, the right-left direction is the axial direction of the tire 72, and the up-down direction is the radial direction of the tire 72. The direction perpendicular to the surface of the sheet of FIG. 3 is the circumferential direction of the tire 72.

The tire 72 has the same structure as the structure of the tire 22 shown in FIG. 1, except that a reinforcing layer 74 is provided. Therefore, in FIG. 3, members that are the same as the members of the tire 22 in FIG. 1 are designated by the same reference characters and the description thereof is omitted.

Also in the tire 72, similar to the tire 22 shown in FIG. 1, the length of the apex 50 is not less than 10 mm and not greater than 15 mm. The apex 50 of the tire 72 is smaller than the conventional apex 8. The apex 50 contributes to weight reduction. The apex 50 contributes to reduction of rolling resistance.

In the tire 72, the main body portion 54, which extends along the inner surface 62 of the apex 50, is tilted relative to the axial direction. The angle of the main body portion 54 relative to the axial direction at the bead 30 portion is not less than 40° and not greater than 60°.

In the tire 72, the apex 50, which is smaller than that in the conventional tire 2 is used, and the tilt angle of the main body portion 54, which extends along the inner surface 62 of the apex 50, is set within a range of 40° to 60°. In the tire 72, between the core 48 and the position PW at which the maximum width is obtained, the main body portion 54 extends substantially linearly. Since the main body portion 54 is formed with a short length at the bead 30 portion, volume reduction is achieved in the tire 72. In the tire 72, reduction of rolling resistance is achieved.

As described above, in the tire 72, between the core 48 and the position PW at which the maximum width is obtained, the main body portion 54 extends substantially linearly. In the shape of the main body portion 54, an inflection point that is observed in the conventional tire 2 is not formed. In the tire 72, reduction of in-plane torsional stiffness based on the shape of the main body portion 54 is inhibited. In the tire 72, although the small apex 50 is used, sufficient stiffness is ensured. In the tire 72, reduction of rolling resistance is achieved while desired stiffness is ensured.

In the tire 72, the reinforcing layer 74 is provided between the carcass 34 and the clinch 28. In particular, the reinforcing layer 74 of the tire 72 is a rubber reinforcing layer 76 formed from a crosslinked rubber. The rubber reinforcing layer 76, together with the small apex 50, contributes to the stiffness of the bead 30 portion. In the tire 72, sufficient durability is ensured.

In the tire 72, a loss tangent LTr of the rubber reinforcing layer 76 is preferably equal to the loss tangent LTa of the apex 50, or lower than the loss tangent LTa of the apex 50. Since the rubber reinforcing layer 76 is used, heat generation due to deformation is inhibited in the bead 30 portion. In the tire 72, the rubber reinforcing layer 76 contributes to reduction of rolling resistance. From this standpoint, the loss tangent LTr of the rubber reinforcing layer 76 is more preferably lower than the loss tangent LTa of the apex 50. Specifically, the difference (LTa−LTr) between the loss tangent LTa of the apex 50 and the loss tangent LTr of the rubber reinforcing layer 76 is preferably not less than 0.00 and more preferably not less than 0.04. Since it is more preferable that the loss tangent LTr of the rubber reinforcing layer 76 is lower, it is more preferable that the difference (LTa−LTr) is greater, from the standpoint of reduction of rolling resistance.

In the tire 72, the loss tangent LTr of the rubber reinforcing layer 76 is preferably not greater than 0.16. The rubber reinforcing layer 76 contributes to reduction of rolling resistance. From this standpoint, the loss tangent LTr is more preferably not greater than 0.14 and further preferably not greater than 0.12.

As described above, in the tire 72, the rubber reinforcing layer 76, together with the small apex 50, contributes to the stiffness of the bead 30 portion. In the tire 72, a complex elastic modulus $E^*r$ of the rubber reinforcing layer 76 is set within a range of not less than 60 MPa and not greater than 100 MPa.

In the present invention, the loss tangent LTr and the complex elastic modulus $E^*r$ of the rubber reinforcing layer 76 are measured in the same manner as the loss tangent LTa and the complex elastic modulus $E^*a$ of the apex 50.

As described above, the complex elastic modulus $E^*a$ of the apex 50 is set within the range of not less than 60 MPa and not greater than 120 MPa. In the tire 72, the idea underlying the setting of the complex elastic modulus $E^*r$ of the rubber reinforcing layer 76, which contributes to ensuring desired stiffness, is different between a soft type apex 50 having a complex elastic modulus $E^*a$ not greater than 100 MPa and a hard type apex 50 having a complex elastic modulus $E^*a$ exceeding 100 MPa. Thus, the following will describe each case.

[Case where the Complex Elastic Modulus $E^*a$ of the Apex 50 is not Greater than 100 MPa]

In the tire 72, when a soft type apex is used as each apex 50, the complex elastic modulus $E^*r$ of the rubber reinforcing layer 76 is preferably equal to the complex elastic modulus $E^*a$ of the apex 50, or higher than the complex elastic modulus $E^*a$ of the apex 50. Since the rubber reinforcing layer 76 contributes to improvement of in-plane torsional stiffness, sufficient stiffness is ensured in the tire 72. In the tire 72, good steering stability is obtained. From this standpoint, the complex elastic modulus $E^*r$ of the rubber reinforcing layer 76 is more preferably higher than the complex elastic modulus $E^*a$ of the apex 50. Specifically, the ratio ($E^*r/E^*a$) of the complex elastic modulus $E^*r$ of the rubber reinforcing layer 76 to the complex elastic modulus $E^*a$ of the apex 50 is preferably not less than 1.0 and more preferably not less than 1.5. From the standpoint of durability, the ratio ($E^*r/E^*a$) is preferably not greater than 1.8.

In the tire 72, from the standpoint that reduction of rolling resistance is achieved while desired stiffness is ensured, in the case of using a soft type apex as each apex 50, more preferably, the loss tangent LTr of the rubber reinforcing layer 76 is equal to the loss tangent LTa of the apex 50, or lower than the loss tangent LTa of the apex 50, and the complex elastic modulus $E^*r$ of the rubber reinforcing layer 76 is equal to the complex elastic modulus $E^*a$ of the apex 50, or higher than the complex elastic modulus $E^*a$ of the apex 50. In the tire 72, further preferably, the loss tangent LTr of the rubber reinforcing layer 76 is lower than the loss tangent LTa of the apex 50, and the complex elastic modulus E*r of the rubber reinforcing layer 76 is higher than the complex elastic modulus E*a of the apex 50.

[Case where the Complex Elastic Modulus E*a of the Apex 50 Exceeds 100 MPa]

In the tire 72, when a hard type apex is used as each apex 50, the complex elastic modulus E*r of the rubber reinforcing layer 76 is preferably equal to the complex elastic modulus E*a of the apex 50, or lower than the complex elastic modulus E*a of the apex 50. In the tire 72, improvement of in-plane torsional stiffness is achieved by the rubber reinforcing layer 76, and the apex 50 contributes to the stiffness of the bead 30 portion. In the tire 72, sufficient stiffness is ensured, and thus good steering stability is obtained. From the standpoint that the stiffness is adjusted in a balanced manner, the complex elastic modulus E*r of the rubber reinforcing layer 76 is more preferably lower than the complex elastic modulus E*a of the apex 50. Specifically, the ratio (E*r/E*a) of the complex elastic modulus E*r of the rubber reinforcing layer 76 to the complex elastic modulus E*a of the apex 50 is preferably not greater than 1.0 and more preferably not greater than 0.8. From the standpoint of durability, the ratio (E*r/E*a) is preferably not less than 0.5.

In the tire 72, from the standpoint that reduction of rolling resistance is achieved while desired stiffness is ensured, in the case of using a hard type apex as each apex 50, more preferably, the loss tangent LTr of the rubber reinforcing layer 76 is equal to the loss tangent LTa of the apex 50, or lower than the loss tangent LTa of the apex 50, and the complex elastic modulus E*r of the rubber reinforcing layer 76 is equal to the complex elastic modulus E*a of the apex 50, or lower than the complex elastic modulus E*a of the apex 50. In the tire 72, further preferably, the loss tangent LTr of the rubber reinforcing layer 76 is lower than the loss tangent LTa of the apex 50, and the complex elastic modulus E*r of the rubber reinforcing layer 76 is lower than the complex elastic modulus E*a of the apex 50.

In the tire 72, the complex elastic modulus E*r of the rubber reinforcing layer 76 is higher than the complex elastic modulus E*c of the clinch 28. The rubber reinforcing layer 76 is harder than the clinch 28. The rubber reinforcing layer 76 contributes to the stiffness of the bead 30 portion. As shown in FIG. 3, the rubber reinforcing layer 76 supports the main body portion 54, which extends linearly between the core 48 and the maximum width position PW. In the tire 72, the rubber reinforcing layer 76 contributes to ensuring desired in-plane torsional stiffness. From this standpoint, in the tire 72, the ratio of the complex elastic modulus E*r of the rubber reinforcing layer 76 to the complex elastic modulus E*c of the clinch 28 is preferably not less than 4. From the standpoint of durability, this ratio is preferably not greater than 20.

In the tire 72, the loss tangent LTr of the rubber reinforcing layer 76 is higher than the loss tangent LTc of the clinch 28. Thus, the amount of heat generated due to deformation of the rubber reinforcing layer 76 is larger than that of the clinch 28. However, since the rubber reinforcing layer 76 contributes to the stiffness of the bead 30 portion, deformation due to application of a load is inhibited at the bead 30 portion. In the tire 72, although the rubber reinforcing layer 76 having a higher loss tangent than the clinch 28 is provided, increase of rolling resistance is inhibited.

In FIG. 3, reference character PR represents an outer edge of the rubber reinforcing layer 76. Reference character PW represents the position at which the tire 72 has a maximum width (hereinafter, referred to as maximum width position PW), and reference character PC represents an outer edge of the clinch 28.

As shown in FIG. 3, the outer edge PR of the rubber reinforcing layer 76 is located radially outward of the outer edge PC of the clinch 28. In the tire 72, the main body portion 54, which extends linearly between the core 48 and the maximum width position PW, is sufficiently supported by the hard rubber reinforcing layer 76. In the tire 72, the rubber reinforcing layer 76 contributes to ensuring desired in-plane torsional stiffness. From this standpoint, in the tire 72, the outer edge PR of the rubber reinforcing layer 76 is preferably located radially outward of the outer edge PC of the clinch 28. Specifically, the outer edge PR of the rubber reinforcing layer 76 is preferably located at a position away and radially outward from the outer edge PC of the clinch 28 by a distance not less than 3 mm and not greater than 7 mm.

As shown in FIG. 3, in the tire 72, the outer edge PR of the rubber reinforcing layer 76 is located radially inward of the maximum width position PW. In the tire 72, the volume of the rubber reinforcing layer 76 is appropriately maintained. In the tire 72, increase of rolling resistance is prevented. From this standpoint, in the tire 72, the outer edge PR of the rubber reinforcing layer 76 is preferably located radially inward of the maximum width position PW. Specifically, the outer edge PR of the rubber reinforcing layer 76 is preferably located at a position away and radially inward from the maximum width position PW by a distance not less than 3 mm and not greater than 7 mm.

In the tire 72, from the standpoint that reduction of rolling resistance is achieved while desired stiffness is ensured, the outer edge PR of the rubber reinforcing layer 76 is further preferably located radially outward of the outer edge PC of the clinch 28 and radially inward of the maximum width position PW.

In FIG. 3, a double-headed arrow TC represents the thickness of the clinch 28 measured along a line that is normal to the main body portion 54 of the carcass 34 and passes through the position P25 on the outer surface of the tire 72 at which the distance H25 in the radial direction from the bead base line BBL is 25 mm A double-headed arrow TR represents the thickness of the rubber reinforcing layer 76 measured along the line normal to the main body portion 54.

In the tire 72, the ratio of the thickness TR of the rubber reinforcing layer 76 to the thickness TC of the clinch 28 is preferably not less than 0.3 and preferably not greater than 0.45. Thus, the rubber reinforcing layer 76, together with the clinch 28, effectively contributes to the stiffness of the tire 72. In the tire 72, reduction of rolling resistance is achieved while desired stiffness is ensured.

In FIG. 3, a double-headed arrow TM represents the thickness of the rubber reinforcing layer 76 at the outer edge PA of the apex 50. The thickness TM is measured along a line normal to an outer surface 78 of the rubber reinforcing layer 76.

In the tire 72, from the standpoint of effective reinforcement by the rubber reinforcing layer 76, the thickness TM is preferably not less than 3 mm and preferably not greater than 5 mm.

Third Embodiment

Figure 4:
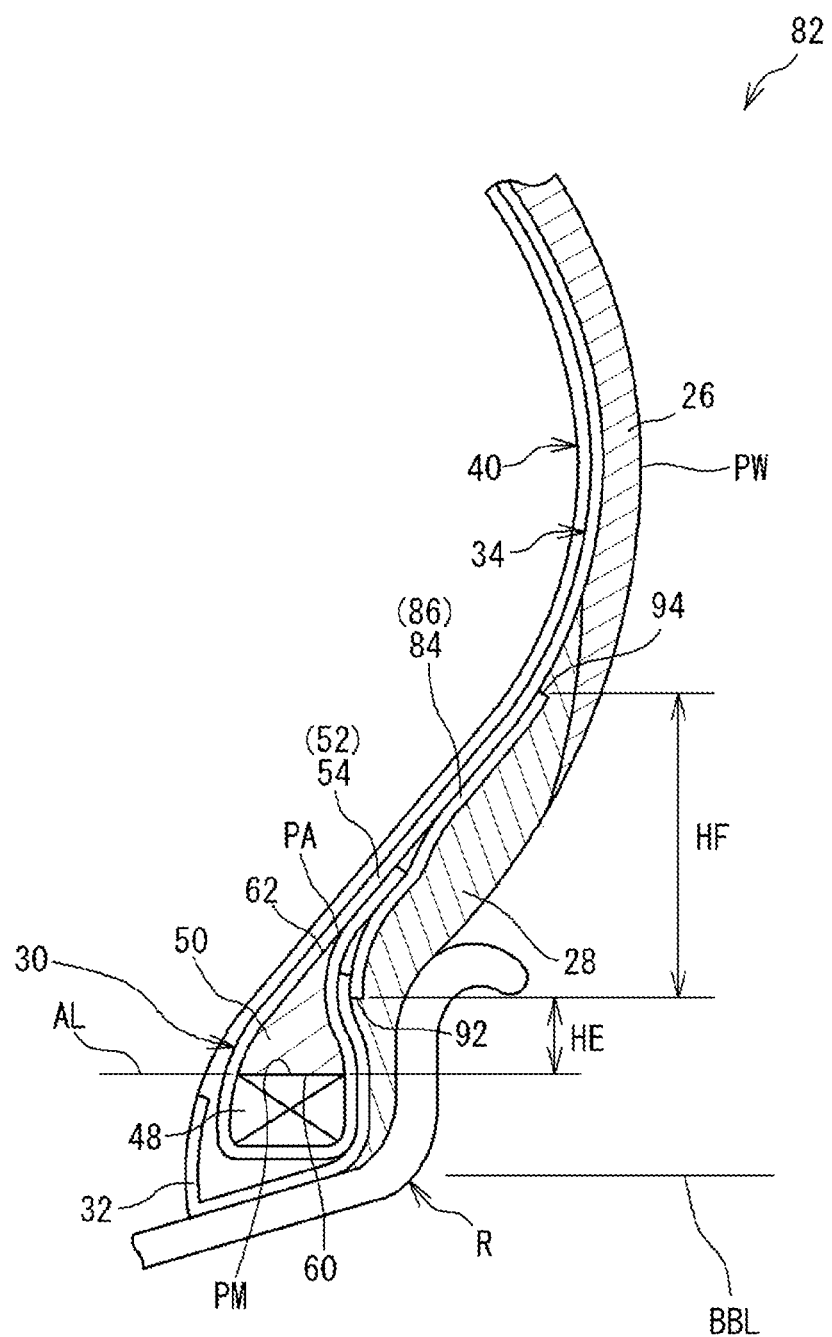
FIG. 4 is a cross-sectional view of a part of a pneumatic tire according to still another embodiment of the present invention.

FIG. 4 shows a part of a pneumatic tire 82 according to still another embodiment of the present invention. FIG. 4 shows a part of a cross-section of the tire 82 along a plane including the rotation axis of the tire 82. In FIG. 4, the right-left direction is the axial direction of the tire 82, and the up-down direction is the radial direction of the tire 82. The direction perpendicular to the surface of the sheet of FIG. 4 is the circumferential direction of the tire 82.

The tire 82 has the same structure as the structure of the tire 22 shown in FIG. 1, except that a reinforcing layer 84 is provided. Therefore, in FIG. 4, members that are the same as the members of the tire 22 in FIG. 1 are designated by the same reference characters and the description thereof is omitted.

Also in the tire 82, similar to the tire 22 shown in FIG. 1, the length of the apex 50 is not less than 10 mm and not greater than 15 mm. The apex 50 of the tire 82 is smaller than the conventional apex 8. The apex 50 contributes to weight reduction. The apex 50 contributes to reduction of rolling resistance.

In the tire 82, the main body portion 54, which extends along the inner surface 62 of the apex 50, is tilted relative to the axial direction. The angle of the main body portion 54 relative to the axial direction at the bead 30 portion is not less than 40° and not greater than 60°.

In the tire 82, the apex 50, which is smaller than that in the conventional tire 2, is used, and the tilt angle of the main body portion 54, which extends along the inner surface 62 of the apex 50, is set within a range of 40° to 60°. In the tire 82, between the core 48 and the position PW at which the maximum width is obtained, the main body portion 54 extends substantially linearly. Since the main body portion 54 is formed with a short length at the bead 30 portion, volume reduction is achieved in the tire 82. In the tire 82, reduction of rolling resistance is achieved.

As described above, in the tire 82, between the core 48 and the position PW at which the maximum width is obtained, the main body portion 54 extends substantially linearly. In the shape of the main body portion 54, an inflection point that is observed in the conventional tire 2 is not formed. In the tire 82, reduction of in-plane torsional stiffness based on the shape of the main body portion 54 is inhibited. In the tire 82, although the small apex 50 is used, sufficient stiffness is ensured. The tire 82 has excellent steering stability. In the tire 82, reduction of rolling resistance is achieved while desired stiffness is ensured.

In the tire 82, similar to the tire 72 shown in FIG. 3, the reinforcing layer 84 is provided between the carcass 34 and the clinch 28. In particular, the reinforcing layer 84 of the tire 82 is not the aforementioned rubber reinforcing layer 76 but a cord reinforcing layer 86. In the tire 82, the cord reinforcing layer 86 is covered with the clinch 28. The cord reinforcing layer 86, together with the small apex 50, contributes to the stiffness of the bead 30 portion. In the tire 82, sufficient durability is ensured.

In the tire 82, the cord reinforcing layer 86 includes a large number of filler cords aligned with each other. The filler cords are covered with a topping rubber. In the tire 82, a steel cord may be used as each filler cord. A cord formed from an organic fiber (hereinafter, also referred to as organic fiber cord) may be used as each filler cord. In this case, polyester fibers, nylon fibers, rayon fibers, and aramid fibers are preferably used as the organic fiber.

Figure 5:
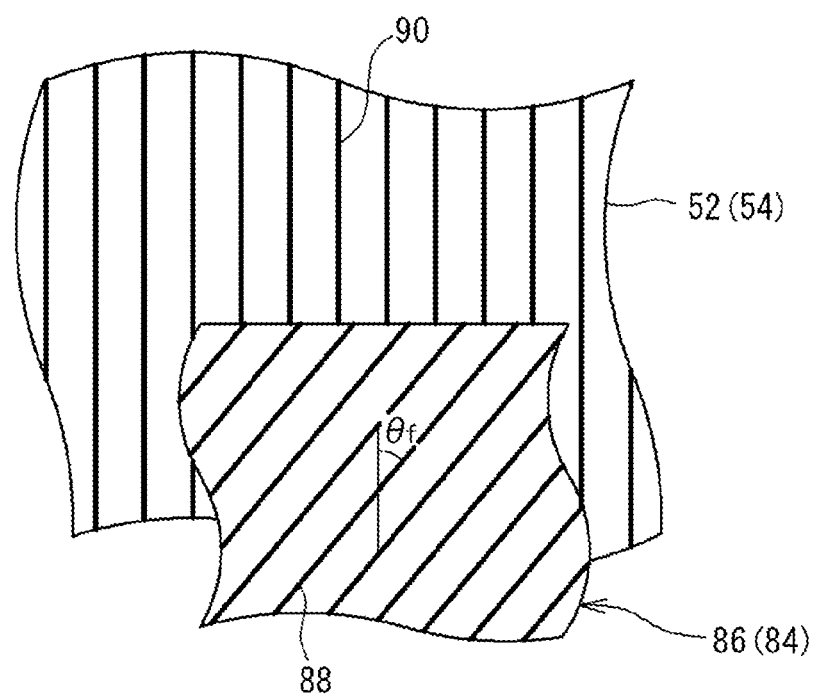
FIG. 5 illustrates arrangement states of carcass cords and filler cords in a bead portion of the tire in FIG. 4.

FIG. 5 shows an arrangement state of filler cords 88 included in the cord reinforcing layer 86, together with an arrangement state of carcass cords 90 included in the main body portion 54 of the carcass ply 52. In FIG. 5, the up-down direction is the radial direction of the tire 82, and the right-left direction is the circumferential direction of the tire 82. As shown in FIG. 5, the filler cords 88 are tilted relative to the radial direction.

In FIG. 5, reference character θf represents the angle of the filler cord 88 relative to the radial direction. In the tire 82, the tilt angle θf of the filler cord 88 is not less than 30° and not greater than 70°. The number of filler cords 88 in the cord reinforcing layer 86 is not less than 20 and not greater than 40 per a width of 50 mm of the cord reinforcing layer 86.

As shown in FIG. 4, in the tire 82, an inner edge 92 of the cord reinforcing layer 86 overlaps the apex 50 in the axial direction. In the tire 82, integration of the cord reinforcing layer 86 with the apex 50 is ensured. The tire 82 can achieve improvement of stiffness by cooperation between the cord reinforcing layer 86 and the apex 50. Furthermore, since the inner edge 92 of the cord reinforcing layer 86 is located at an appropriate position, the tilt angle of the main body portion 54 is set within a predetermined range in the tire 82. The tire 82 can achieve reduction of rolling resistance while ensuring desired stiffness. From this standpoint, in the tire 82, the inner edge 92 of the cord reinforcing layer 86 preferably overlaps the apex 50 in the axial direction. In the tire 82, the inner edge 92 of the cord reinforcing layer 86 is more preferably located radially inward of the outer edge PA of the apex 50 and radially outward of the center PM in the axial direction of the boundary 60.

In FIG. 4, a double-headed arrow HE represents the distance in the radial direction from the center PM in the axial direction of the boundary 60 between the core 48 and the apex 50 to the inner edge 92 of the cord reinforcing layer 86. A double-headed arrow HF represents the distance in the radial direction from the inner edge 92 of the cord reinforcing layer 86 to an outer edge 94 of the cord reinforcing layer 86. The distance HF is the height in the radial direction of the cord reinforcing layer 86.

In the tire 82, from the standpoint that integration with the apex 50 is ensured and the tilt angle of the main body portion 54 is set within a predetermined range, the distance HE in the radial direction from the center PM in the axial direction of the boundary 60 between the core 48 and the apex 50 to the inner edge 92 of the cord reinforcing layer 86 is preferably not less than 5 mm and preferably not greater than 10 mm.

In the tire 82, the proportion of the distance HF in the radial direction from the inner edge 92 of the cord reinforcing layer 86 to the outer edge 94 of the cord reinforcing layer 86 to the cross-sectional height HS of the tire 82 is preferably not less than 20% and preferably not greater than 50%. When the proportion is set so as to be not less than 20%, the cord reinforcing layer 86 contributes to ensuring desired in-plane torsional stiffness. In the tire 82, good steering stability is obtained. From this standpoint, the proportion is more preferably not less than 25%. When the proportion is set so as to be not greater than 50%, the stiffness of the portion of the tire 82 from a buttress to the bead 30, that is, a side portion of the tire 82, is appropriately maintained. The difference between the stiffness of the tread 24 portion and the stiffness of the side portion is reduced, and thus good steering stability is obtained in the tire 82. From this standpoint, the proportion is more preferably not greater than 45%.

As described above, the cord reinforcing layer 86 includes the filler cords 88. The outer diameters of the filler cords 88, that is, cord diameters, influence the stiffness of the cord reinforcing layer 86.

In the tire 82, when an organic fiber cord is used as each filler cord 88, the cord diameter of the organic fiber cord is preferably not less than 0.3 mm and preferably not greater than 1.0 mm. When the cord diameter is set so as to be not less than 0.3 mm, the cord reinforcing layer 86 contributes to ensuring desired in-plane torsional stiffness. In the tire 82, good steering stability is obtained. From this standpoint, the cord diameter is more preferably not less than 0.4 mm. When the cord diameter is set so as to be not greater than 1.0 mm, the stiffness of the side portion of the tire 82 is appropriately maintained. Since the difference between the stiffness of the tread 24 portion and the stiffness of the side portion is reduced, good steering stability is obtained in the tire 82. From this standpoint, the cord diameter is more preferably not greater than 0.8 mm.

In the tire 82, when a steel cord is used as each filler cord 88, the cord diameter of the steel cord is preferably not less than 0.3 mm and preferably not greater than 3.5 mm. When the cord diameter is set so as to be not less than 0.3 mm, the cord reinforcing layer 86 contributes to ensuring desired in-plane torsional stiffness. In the tire 82, good steering stability is obtained. From this standpoint, the cord diameter is more preferably not less than 0.5 mm. When the cord diameter is set so as to be not greater than 3.5 mm, the stiffness of the side portion of the tire 82 is appropriately maintained. Since the difference between the stiffness of the tread 24 portion and the stiffness of the side portion is reduced, good steering stability is obtained in the tire 82. From this standpoint, the cord diameter is more preferably not greater than 1.0 mm.

As is obvious from the above description, according to the present invention, a pneumatic tire that achieves reduction of rolling resistance while ensuring desired stiffness is obtained.

The embodiments disclosed above are merely illustrative in all aspects and are not restrictive. The technical scope of the present invention is not limited to the above-described embodiments, and all changes which come within the range of equivalency of the configurations recited in the claims are therefore intended to be included therein.

EXAMPLES

The following will describe the present invention in further detail by means of examples, etc., but the present invention is not limited to these examples.
<Experiment 1>

Example 1

A passenger car pneumatic tire (tire size=205/55R16) having the basic structure shown in FIG. 3 and having the specifications shown in Table 1 below was obtained.

In Example 1, the length LA of each apex was 10 mm. The tilt angle θc of the main body portion extending along the inner surface of the apex was 50°. The loss tangent LTr of the rubber reinforcing layer was 0.16, and the complex elastic modulus E*r of the rubber reinforcing layer was 60 MPa. The loss tangent LTa of the apex was 0.16, and the complex elastic modulus E*a of the apex was 60 MPa. The apex is of a soft type. The loss tangent LTc of each clinch was 0.04, and the complex elastic modulus E*c of each clinch was 15 MPa.

Comparative Example 1

Figure 6:
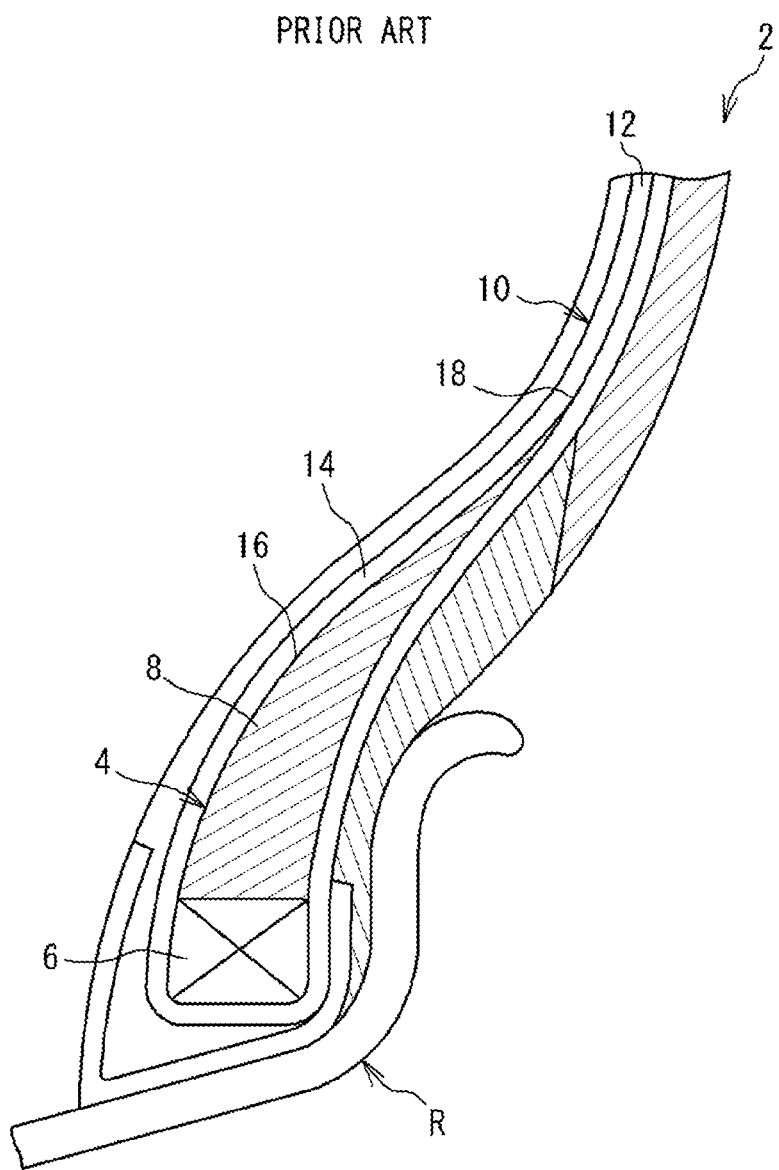
FIG. 6 is a cross-sectional view of a bead portion of a conventional tire.

A tire of Comparative Example 1 was obtained in the same manner as Example 1, except that no rubber reinforcing layer was provided and the length LA and the angle θc were set as shown in Table 1 below. The structure of Comparative Example 1 is the same as the structure of the conventional tire shown in FIG. 6.

Comparative Example 2

A tire of Comparative Example 2 was obtained in the same manner as Example 1, except that no rubber reinforcing layer was provided and the angle θc was set as shown in Table 1 below.

Example 2 and Comparative Examples 3 and 4

Tires of Example 2 and Comparative Examples 3 and 4 were obtained in the same manner as Example 1, except that the angle θc was set as shown in Table 1 below.

Examples 3 and 4

Tires of Examples 3 and 4 were obtained in the same manner as Example 1, except that the loss tangent LTr was set as shown in Table 2 below.

Example 5

A tire of Example 5 was obtained in the same manner as Example 1, except that the loss tangent LTr and the complex elastic modulus E*r were set as shown in Table 2 below.

Example 6

A tire of Example 6 was obtained in the same manner as Example 1, except that the complex elastic modulus E*r was set as shown in Table 2 below.

[Rolling Resistance]

Each sample tire was fitted onto a normal rim and the internal pressure thereof was adjusted to 210 kPa. Rolling resistance (RR) was measured by using a rolling resistance testing machine. A load was set to 4.8 kN. A speed was set to 80 km/h. The results are shown as indexes in Table 1 and Table 2 below. The higher the value is, the lower the rolling resistance is.

[In-Plane Torsional Stiffness]

Each sample tire was fitted onto a normal rim and the internal pressure thereof was adjusted to 250 kPa. Reaction force was measured by using an in-plane torsional stiffness testing machine when the tread surface of the tire was fixed and the rim was rotated by 0.8° in the circumferential direction. The results are shown as indexes in Table 1 and Table 2 below. The higher the value is, the higher the in-plane torsional stiffness is.

[Combined Performance]

The sum of the indexes obtained in the respective evaluations of rolling resistance and in-plane torsional stiffness was obtained. The results are indicated as combined performance in Table 1 and Table 2 below. The higher the value is, the better the performance is.

TABLE 1

|  |  | Comparative Example 1 | Comparative Example 2 | Comparative Example 3 | Example 1 | Example 2 | Comparative Example 4 |
|---|---|---|---|---|---|---|---|
| LA [mm] | | 35 | 10 | 10 | 10 | 10 | 10 |
| Angle θc [°] | | 65 | 65 | 65 | 50 | 40 | 35 |
| Rubber reinforcing layer | LTr [—] | — | — | 0.16 | 0.16 | 0.16 | 0.16 |
|  | E*r [MPa] | — | — | 60 | 60 | 60 | 60 |
| Apex | LTa [—] | 0.16 | 0.16 | 0.16 | 0.16 | 0.16 | 0.16 |
|  | E*a [MPa] | 60 | 60 | 60 | 60 | 60 | 60 |
| RR | | 100 | 105 | 100 | 103 | 102 | 98 |
| In-plane torsional stiffness | | 100 | 83 | 100 | 101 | 104 | 106 |
| Combined performance | | 200 | 188 | 200 | 204 | 206 | 204 |

TABLE 2

|  |  | Example 3 | Example 4 | Example 5 | Example 6 |
|---|---|---|---|---|---|
| LA [mm] | | 10 | 10 | 10 | 10 |
| Angle θc [°] | | 50 | 50 | 50 | 50 |
| Rubber reinforcing layer | LTr [—] | 0.12 | 0.18 | 0.12 | 0.16 |
|  | E*r [MPa] | 60 | 60 | 100 | 100 |
| Apex | LTa [—] | 0.16 | 0.16 | 0.16 | 0.16 |
|  | E*a [MPa] | 60 | 60 | 60 | 60 |
| RR | | 106 | 102 | 106 | 103 |
| In-plane torsional stiffness | | 101 | 101 | 111 | 111 |
| Combined performance | | 207 | 203 | 217 | 214 |

As shown in Table 1 and Table 2, the examples are highly rated, as compared to the comparative examples. In particular, in the examples, reduction of rolling resistance is achieved while desired stiffness is ensured. From the evaluation results, advantages of the present invention are clear.
<Experiment 2>

Example 7

A passenger car pneumatic tire (tire size=205/55R16) having the basic structure shown in FIG. 1 and FIG. 2 and having the specifications shown in Table 3 below was obtained.

In Example 7, the length LA of each apex was 10 mm. The tilt angle θc of the main body portion extending along the inner surface of the apex was 50°. The loss tangent LTa of the apex was 0.18, and the complex elastic modulus E*a of the apex was 120 MPa. The apex is of a hard type.

In Example 7, the loss tangent LTc of each clinch was 0.04, and the complex elastic modulus E*c of each clinch was 15 MPa. The distance HC in the radial direction from the bead base line to the outer edge of the clinch was 40 mm. The thickness TC of the clinch measured along a line that passes through the position P25 and is normal to the main body portion was 5.0 mm.

Comparative Example 5

A tire of Comparative Example 5 was obtained in the same manner as Example 7, except that the length LA, the angle θc, the loss tangent LTc, and the complex elastic modulus E*c were set as shown in Table 3 below.

Comparative Example 6

A tire of Comparative Example 6 was obtained in the same manner as Example 7, except that the length LA and the angle θc were set as shown in Table 3 below.

Example 8

A tire of Example 8 was obtained in the same manner as Example 7, except that the loss tangent LTc was set as shown in Table 3 below.

Example 9

A tire of Example 9 was obtained in the same manner as Example 7, except that the complex elastic modulus E*c was set as shown in Table 3 below.

Example 10

A tire of Example 10 was obtained in the same manner as Example 7, except that the distance HC was set as shown in Table 3 below.

Example 11

A tire of Example 11 was obtained in the same manner as Example 7, except that the thickness TC was set as shown in Table 3 below.

Example 12

A passenger car pneumatic tire (tire size=205/55R16) having the basic structure shown in FIG. 3 and having the specifications shown in Table 4 below was obtained.

In Example 12, the length LA of each apex was 10 mm. The tilt angle θc of the main body portion extending along the inner surface of the apex was 50°. The loss tangent LTa of the apex was 0.18, and the complex elastic modulus E*a of the apex was 120 MPa. The apex is of a hard type.

In Example 12, the loss tangent LTr of the rubber reinforcing layer was 0.14, and the complex elastic modulus E*r of the rubber reinforcing layer was 85 MPa. The loss tangent LTc of each clinch was 0.04, and the complex elastic modulus E*c of each clinch was 15 MPa. The distance HC was 40 mm, and the thickness TC was 5.0 mm.

Example 13

A tire of Example 13 was obtained in the same manner as Example 12, except that the loss tangent LTc was set as shown in Table 4 below.

Example 14

A tire of Example 14 was obtained in the same manner as Example 12, except that the complex elastic modulus E*c was set as shown in Table 4 below.

Example 15

A tire of Example 15 was obtained in the same manner as Example 12, except that the distance HC was set as shown in Table 4 below.

Example 16

A tire of Example 16 was obtained in the same manner as Example 12, except that the thickness TC was set as shown in Table 4 below.

[Rolling Resistance]

An index for rolling resistance was obtained in the same manner as Experiment 1 described above. The results are shown as indexes in Table 3 and Table 4 below. The higher the value is, the lower the rolling resistance is.

[In-Plane Torsional Stiffness]

An index for in-plane torsional stiffness was obtained in the same manner as Experiment 1 described above. The results are shown as indexes in Table 3 and Table 4 below. The higher the value is, the higher the in-plane torsional stiffness is.

[Combined Performance]

The sum of the indexes obtained in the respective evaluations of rolling resistance and in-plane torsional stiffness was obtained. The results are indicated as combined performance in Table 3 and Table 4 below. The higher the value is, the better the performance is.

TABLE 3

|   |   | Comparative Example 5 | Comparative Example 6 | Example 7 | Example 8 | Example 9 | Example 10 | Example 11 |
|---|---|---|---|---|---|---|---|---|
| LA [mm] | | 35 | 35 | 10 | 10 | 10 | 10 | 10 |
| Angle θc [°] | | 70 | 70 | 50 | 50 | 50 | 50 | 50 |
| Rubber reinforcing layer | LTr [—] | — | — | — | — | — | — | — |
| | E*r [MPa] | — | — | — | — | — | — | — |
| Apex | LTa [—] | 0.18 | 0.18 | 0.18 | 0.18 | 0.18 | 0.18 | 0.18 |
| | E*a [MPa] | 120 | 120 | 120 | 120 | 120 | 120 | 120 |
| Clinch | LTc [—] | 0.15 | 0.04 | 0.04 | 0.11 | 0.04 | 0.04 | 0.04 |
| | E*c [MPa] | 4 | 15 | 15 | 15 | 5 | 15 | 15 |
| | HC [mm] | 40 | 40 | 40 | 40 | 40 | 30 | 40 |
| | TC [mm] | 5.0 | 5.0 | 5.0 | 5.0 | 5.0 | 5.0 | 4.0 |
| RR | | 100 | 100 | 120 | 105 | 120 | 120 | 120 |
| In-plane torsional stiffness | | 100 | 100 | 120 | 120 | 110 | 115 | 115 |
| Combined performance | | 200 | 200 | 240 | 225 | 230 | 235 | 235 |

TABLE 4

|   |   | Example 12 | Example 13 | Example 14 | Example 15 | Example 16 |
|---|---|---|---|---|---|---|
| LA [mm] | | 10 | 10 | 10 | 10 | 10 |
| Angle θc [°] | | 50 | 50 | 50 | 50 | 50 |
| Rubber reinforcing layer | LTr [—] | 0.14 | 0.14 | 0.14 | 0.14 | 0.14 |
| | E*r [MPa] | 85 | 85 | 85 | 85 | 85 |
| Apex | LTa [—] | 0.18 | 0.18 | 0.18 | 0.18 | 0.18 |
| | E*a [MPa] | 120 | 120 | 120 | 120 | 120 |
| Clinch | LTc [—] | 0.04 | 0.11 | 0.04 | 0.04 | 0.04 |
| | E*c [MPa] | 15 | 15 | 5 | 15 | 15 |
| | HC [mm] | 40 | 40 | 40 | 30 | 40 |
| | TC [mm] | 5.0 | 5.0 | 5.0 | 5.0 | 4.0 |
| RR | | 120 | 105 | 120 | 120 | 120 |
| In-plane torsional stiffness | | 130 | 130 | 120 | 125 | 125 |
| Combined performance | | 250 | 235 | 240 | 245 | 245 |

As shown in Table 3 and Table 4, the examples are highly rated, as compared to the comparative examples. In particular, in the examples, reduction of rolling resistance is achieved while desired stiffness is ensured. From the evaluation results, advantages of the present invention are clear.

<Experiment 3>

Example 17

A passenger car pneumatic tire (tire size=205/55R16) having the basic structure shown in FIG. 4 and having the specifications shown in Table 5 below was obtained.

In Example 17, the length LA of each apex was 10 mm. The tilt angle θc of the main body portion extending along the inner surface of the apex was 50°. The loss tangent LTa of the apex was 0.16, and the complex elastic modulus E*a of the apex was 60 MPa. The apex is of a soft type. The loss tangent LTc of each clinch was 0.04, and the complex elastic modulus E*c of each clinch was 15 MPa.

In Example 17, a cord reinforcing layer was used as the reinforcing layer. In the cord reinforcing layer, a cord formed from a nylon fiber was used as each filler cord. This is represented as "N" in the cell for "Type" in the table. The cord diameter of the filler cord was 0.68 mm. The distance HE in the radial direction from the center PM in the axial direction of the boundary between the core and the apex to the inner edge of the cord reinforcing layer was 5 mm. In Example 17, the inner edge of the cord reinforcing layer overlapped the apex in the axial direction. The proportion (HF/HS) of the height HF in the radial direction of the cord reinforcing layer to the cross-sectional height HS was 40%.

Comparative Example 7

A tire of Comparative Example 7 was obtained in the same manner as Example 17, except that no cord reinforcing layer was provided and the length LA and the angle θc were set as shown in Table 5. Comparative Example 7 has the same structure as Comparative Example 1 in Experiment 1 described above.

Reference Example 1

A tire of Reference Example 1 was obtained in the same manner as Example 17, except that the cord reinforcing layer was replaced with a rubber reinforcing layer. Reference Example 1 has the same structure as Example 1 in Experiment 1 described above.

Example 18

A tire of Example 18 was obtained in the same manner as Example 17, except that the distance HE was set as shown in Table 5 below.

Example 19

A tire of Example 19 was obtained in the same manner as Example 17, except that the proportion (HF/HS) was set as shown in Table 5 below.

Example 20

A tire of Example 20 was obtained in the same manner as Example 17, except that the cord diameter was set as shown in Table 6 below.

Examples 21 to 23

Tires of Examples 21 to 23 were obtained in the same manner as Example 17, except that the filler cords were changed. In Examples 21 and 23, a steel cord was used as each filler cord. This is represented as "S" in the cell for "Type" in the table. In Example 21, the cord diameter was 0.85 mm. In Example 23, the cord diameter was 0.65 mm. In Example 22, a cord formed from an aramid fiber was used as each filler cord. This is represented as "A" in the cell for "Type" in the table. In Example 22, the cord diameter was 0.68 mm

[Weight]

The weight of each sample tire was measured. The results are shown as indexes in Table 5 and Table 6 below. The higher the value is, the lower the weight is.

[Rolling Resistance]

An index for rolling resistance was obtained in the same manner as Experiment 1 described above. The results are shown as indexes in Table 5 and Table 6 below. The higher the value is, the lower the rolling resistance is.

[In-Plane Torsional Stiffness]

An index for in-plane torsional stiffness was obtained in the same manner as Experiment 1 described above. The results are shown as indexes in Table 5 and Table 6 below. The higher the value is, the higher the in-plane torsional stiffness is.

[Steering Stability]

Each sample tire was fitted onto a rim (size=16×6.5 J) and the internal pressure thereof was adjusted to 230 kPa. The tires were mounted to all the wheels of a test vehicle (one person got into the vehicle), and the vehicle ran on a test course having a dry asphalt road surface. Drivers made evaluations (sensory evaluations) for response behavior to steering at low speeds (40 to 80 km/h) and high speeds (100 to 120 km/h). The results are shown as indexes in the cells for "Steering stability" in Table 5 and Table 6 below. The higher the value is, the better the steering stability is.

[Combined Performance]

The sum of the indexes obtained in the respective evaluations of weight, rolling resistance, in-plane torsional stiffness, and steering stability was obtained. The results are indicated as combined performance in Table 5 and Table 6 below. The higher the value is, the better the performance is.

TABLE 5

| | | Comparative Example 7 | Reference Example 1 | Example 17 | Example 18 | Example 19 |
|---|---|---|---|---|---|---|
| LA [mm] | | 35 | 10 | 10 | 10 | 10 |
| Angle θc [°] | | 65 | 50 | 50 | 50 | 50 |
| Rubber reinforcing layer | LTr [—] | — | 0.16 | — | — | — |
| | E*r [MPa] | — | 60 | — | — | — |
| Cord reinforcing layer | Type | — | — | N | N | N |
| | Diameter [mm] | — | — | 0.68 | 0.68 | 0.68 |
| HE [mm] | | — | — | 5 | 15 | 5 |
| HF/HS [%] | | — | — | 40 | 40 | 30 |
| Weight | | 100 | 101 | 105 | 105 | 106 |
| RR | | 100 | 101 | 104 | 105 | 105 |
| In-plane torsional stiffness | | 100 | 101 | 103 | 100 | 102 |
| Steering stability | | 100 | 101 | 103 | 100 | 102 |
| Combined performance | | 400 | 404 | 415 | 410 | 415 |

TABLE 6

| | | Example 20 | Example 21 | Example 22 | Example 23 |
|---|---|---|---|---|---|
| LA [mm] | | 10 | 10 | 10 | 10 |
| Angle θc [°] | | 50 | 50 | 50 | 50 |
| Rubber reinforcing layer | LTr [—] | — | — | — | — |
| | E*r [MPa] | — | — | — | — |
| Cord reinforcing layer | Type | N | S | A | S |
| | Diameter [mm] | 0.52 | 0.85 | 0.68 | 0.65 |
| HE [mm] | | 5 | 5 | 5 | 5 |
| HF/HS [%] | | 40 | 40 | 40 | 40 |
| Weight | | 106 | 100 | 104 | 100 |

TABLE 6-continued

|  | Example 20 | Example 21 | Example 22 | Example 23 |
|---|---|---|---|---|
| RR | 105 | 107 | 106 | 107 |
| In-plane torsional stiffness | 102 | 110 | 108 | 110 |
| Steering stability | 102 | 110 | 108 | 110 |
| Combined performance | 415 | 427 | 426 | 427 |

As shown in Table 5 and Table 6, the examples are highly rated, as compared to the comparative examples. In particular, in the examples, reduction of rolling resistance is achieved while desired stiffness is ensured. From the evaluation results, advantages of the present invention are clear.

The above-described technology to achieve reduction of rolling resistance while ensuring desired stiffness can also be applied to various tires.

What is claimed is:

1. A pneumatic tire comprising:
a tread;
a pair of sidewalls connected to edges of the tread;
a pair of beads each having a core extending in a circumferential direction and an apex located radially outward of the core;
a carcass extending from one bead to the other bead at an inner side of the tread and the pair of sidewalls; and
a pair of clinches located radially inward of the sidewalls, wherein
the carcass includes a carcass ply having a main body portion that extends on and between one core and the other core and a pair of turned-up portions that are connected to the main body portion and turned up around the cores from an inner side toward an outer side in an axial direction,
in each bead a length from a center in the axial direction of a boundary between the core and the apex to an outer edge of the apex is not less than 10 mm and not greater than 15 mm, and
in a state where the tire is mounted on a normal rim and an internal pressure of the tire is adjusted to 10% of a normal internal pressure,
in each bead the main body portion extending along an inner surface of the apex is tilted relative to the axial direction, and an angle of the main body portion relative to the axial direction is not less than 40° and not greater than 60°,
a reinforcing layer is provided between the carcass and each clinch,
the respective reinforcing layer is a respective rubber reinforcing layer formed from a crosslinked rubber,
a loss tangent of the respective rubber reinforcing layer is equal to a loss tangent of the respective apex or lower than the loss tangent of the respective apex,
a complex elastic modulus of the respective rubber reinforcing layer is not greater than 100 MPa,
the complex elastic modulus of the respective rubber reinforcing layer is equal to a complex elastic modulus of the respective apex or higher than the complex elastic modulus of the respective apex, and
the main body portion extends linearly at a respective portion axially inward with respect to a straight line that extends in a radial direction and passes through a radially outer edge of a respective contact surface of the tire and the normal rim.

2. The pneumatic tire according to claim 1, wherein
a loss tangent of each clinch is lower than a loss tangent of the respective apex, and
a complex elastic modulus of each clinch is lower than a complex elastic modulus of the respective apex.

3. The pneumatic tire according to claim 1, wherein
the loss tangent of the respective rubber reinforcing layer is higher than a loss tangent of the respective clinch, and
the complex elastic modulus of the respective rubber reinforcing layer is higher than a complex elastic modulus of the respective clinch.

4. The pneumatic tire according to claim 1, wherein an outer edge of the respective rubber reinforcing layer is located radially outward of an outer edge of the respective clinch and radially inward of a maximum width position of the tire.

5. The pneumatic tire according to claim 1, wherein
a loss tangent of each clinch is lower than the loss tangent of the respective apex, and
a complex elastic modulus of each clinch is lower than the complex elastic modulus of the respective apex.

6. The pneumatic tire according to claim 1, wherein a ratio of a thickness of the respective rubber reinforcing layer to a thickness of the respective clinch, measured along a line that is normal to the main body portion of the carcass ply and passes through a position on an outer surface of the tire at which a distance in a radial direction from a bead base line is 25 mm, is not less than 0.3 and not greater than 0.45.

7. A pneumatic tire comprising:
a tread;
a pair of sidewalls connected to edges of the tread;
a pair of beads each having a core extending in a circumferential direction and an apex located radially outward of the core;
a carcass extending from one bead to the other bead at an inner side of the tread and the pair of sidewalls; and
a pair of clinches located radially inward of the sidewalls, wherein
the carcass includes a carcass ply having a main body portion that extends on and between one core and the other core and a pair of turned-up portions that are connected to the main body portion and turned up around the cores from an inner side toward an outer side in an axial direction,
in each bead a length from a center in the axial direction of a boundary between the core and the apex to an outer edge of the apex is not less than 10 mm and not greater than 15 mm, and
in a state where the tire is mounted on a normal rim and an internal pressure of the tire is adjusted to 10% of a normal internal pressure,
in each bead the main body portion extending along an inner surface of the apex is tilted relative to the axial direction, and an angle of the main body portion relative to the axial direction is not less than 40° and not greater than 60°,
a reinforcing layer is provided between the carcass and each clinch,
the respective reinforcing layer is a respective rubber reinforcing layer formed from a crosslinked rubber,
a loss tangent of the respective rubber reinforcing layer is equal to a loss tangent of the respective apex or lower than the loss tangent of the respective apex,
a complex elastic modulus of the respective rubber reinforcing layer is not greater than 100 MPa, the complex elastic modulus of the respective rubber reinforcing layer is equal to a complex elastic modulus of the respective apex or higher than the complex elastic modulus of the respective apex, and an outer edge of the respective rubber reinforcing layer is located radially outward of an outer edge of the respective clinch and radially inward of a maximum width position of the tire.

* * * * *